United States Patent
Lazarus et al.

(10) Patent No.: US 9,787,523 B2
(45) Date of Patent: Oct. 10, 2017

(54) MANAGING DATA IN A DATA QUEUE INCLUDING SYNCHRONIZATION OF MEDIA ON MULTIPLE DEVICES

(71) Applicants: Eric Lazarus, Glen Cove, NY (US); Ayal Ryger, Hamden, CT (US); Dan Reardon, Astoria, NY (US)

(72) Inventors: Eric Lazarus, Glen Cove, NY (US); Ayal Ryger, Hamden, CT (US); Chris Stratton, New York, NY (US); Dan Reardon, Astoria, NY (US)

( * ) Notice: Subject to any disclaimer, the term of this patent is extended or adjusted under 35 U.S.C. 154(b) by 687 days.

(21) Appl. No.: 13/934,687

(22) Filed: Jul. 3, 2013

(65) Prior Publication Data

US 2014/0013008 A1 Jan. 9, 2014

Related U.S. Application Data

(60) Provisional application No. 61/668,029, filed on Jul. 5, 2012.

(51) Int. Cl.
*G06F 15/16* (2006.01)
*H04L 29/06* (2006.01)
*H04L 29/08* (2006.01)

(52) U.S. Cl.
CPC .... *H04L 29/06993* (2013.01); *H04L 65/4084* (2013.01); *H04L 65/80* (2013.01); *H04L 67/1095* (2013.01); *H04L 69/28* (2013.01)

(58) Field of Classification Search
None
See application file for complete search history.

(56) References Cited

U.S. PATENT DOCUMENTS

| | | | | |
|---|---|---|---|---|
| 7,936,790 B2* | 5/2011 | Schmidt | ......... | H04J 3/0667 370/503 |
| 8,997,169 B2* | 3/2015 | McCoy | ......... | H04N 21/654 386/201 |
| 9,237,324 B2* | 1/2016 | Lee | ......... | H04L 65/605 |
| 2004/0228367 A1* | 11/2004 | Mosig | ......... | H04L 29/06027 370/503 |
| 2005/0288805 A1* | 12/2005 | Moore | ......... | H04N 21/4143 700/94 |
| 2008/0291863 A1* | 11/2008 | Agren | ......... | H04J 3/0632 370/315 |
| 2010/0151783 A1* | 6/2010 | Cohen | ......... | H04H 60/80 455/3.06 |
| 2010/0172357 A1* | 7/2010 | Poulin | ......... | H04L 12/4633 370/395.4 |
| 2010/0332674 A1* | 12/2010 | van Gassel | ......... | H04L 67/104 709/231 |

(Continued)

*Primary Examiner* — Joshua Joo
(74) *Attorney, Agent, or Firm* — F. Chau & Associates, LLC

(57) ABSTRACT

A method of managing data in a data queue includes analyzing media currently being played, or to be played by a first computing device functioning as a leader to identify an offset into the media and a timestamp corresponding to the offset. A buffer duration is calculated that corresponds to an amount of time that the data queue takes to output data currently in the data queue. The media is played at the leader and a second computing device functioning as a follower, in a substantially synchronized manner, by inputting data to the data queue at a specified time based on the calculated buffer duration, the offset, and the timestamp.

22 Claims, 9 Drawing Sheets

(56) References Cited

U.S. PATENT DOCUMENTS

| | | | | |
|---|---|---|---|---|
| 2012/0195313 A1* | 8/2012 | White | .................. | H04L 43/0858 |
| | | | | 370/390 |
| 2012/0232682 A1* | 9/2012 | Moore | ............... | H04N 21/4143 |
| | | | | 700/94 |
| 2013/0198298 A1* | 8/2013 | Li | .................... | H04N 21/41407 |
| | | | | 709/206 |
| 2014/0362849 A1* | 12/2014 | Sheth | ................ | H04N 21/4302 |
| | | | | 370/350 |
| 2015/0195602 A1* | 7/2015 | Gilson | ............... | H04N 21/4302 |
| | | | | 725/89 |

* cited by examiner

MANAGING DATA IN A DATA QUEUE INCLUDING SYNCHRONIZATION OF MEDIA ON MULTIPLE DEVICES

CROSS-REFERENCE TO RELATED PATENT APPLICATION

This application claims priority to and the benefit of Provisional Application Ser. No. 61/668,029, filed on Jul. 4, 2012, the contents of which are herein incorporated by reference in their entirety.

BACKGROUND

1. Technical Field

The present disclosure relates to managing data in a data queue, and more particularly, to a system and method for managing data in a data queue.

2. Discussion of Related Art

When data stored in a data queue is accessed by multiple devices, it may be desirable that the data is output to the multiple devices in a synchronized manner. For example, it may be desirable for multiple computing devices such as, for example, smart phones and computer tablets, to access audio data stored in a data queue in a synchronized manner, allowing for synchronized playback of the audio data among the multiple devices. Each device's media subsystem can be considered to be a queue with variable latency in starting play. By considering this subsystem as a queue with certain characteristics, it is possible to control what is emitted with great precision.

BRIEF SUMMARY

According to an exemplary embodiment of the present disclosure, a method of managing data in a data queue includes analyzing media currently being played, or to be played by a first computing device functioning as a leader, identifying an offset into the media and a timestamp corresponding to the offset, calculating a buffer duration corresponding to an amount of time that the data queue takes to output data currently in the data queue, and playing the media at the leader and a second computing device functioning as a follower, in a substantially synchronized manner, by inputting data to the data queue at a specified time based on the calculated buffer duration, the offset, and the timestamp.

In an exemplary embodiment, the media data includes audio data.

In an exemplary embodiment, the method further includes outputting data, from the leader, indicating a past position, a present position, or a future position relating to the audio data. The data output by the leader may include a timestamp.

In an exemplary embodiment, the method further includes pre-loading data in the data queue.

In an exemplary embodiment, the data input to the data queue at a specified time includes dummy data.

In an exemplary embodiment, the data input to the data queue at a specified time includes subsequent data to be output to the leader and the follower.

In an exemplary embodiment, the method further includes synchronizing the data output from the data source to the leader and the follower using the network time protocol (NTP).

In an exemplary embodiment, the first and second computing devices are smart phones and/or tablet computers.

BRIEF DESCRIPTION OF THE SEVERAL VIEWS OF THE DRAWINGS

Exemplary embodiments of the present disclosure will be described below in more detail, with reference to the accompanying drawings, in which.

DETAILED DESCRIPTION

Exemplary embodiments of the present disclosure now will be described more fully hereinafter with reference to the accompanying drawings. This disclosure, may however, be embodied in many different forms and should not be construed as limited to embodiments set forth herein.

It is to be understood that although exemplary embodiments of the present disclosure are described using the synchronization of audio playback as an example, exemplary embodiments are not limited thereto. For example, exemplary embodiments may be utilized with any type of queue or buffer that contains data. That is, exemplary embodiments of the present disclosure may be utilized with any system that includes data queues or buffers. For example, exemplary embodiments may be utilized with queues involving other multimedia data such as video, or other non-multimedia data.

Exemplary embodiments may be utilized to provide synchronization of audio among a large number of computing devices including, for example, smart phones and tablet computers. That is, according to exemplary embodiments, a large number of smart phones and tablet computers may play audio in a synchronous manner.

According to an exemplary embodiment, a hand-off technique is utilized to control the output of a data queue (or an audio subsystem of a device functioning as a data queue) based on predicting the average amount of time data within the data queue takes to proceed through the data queue. The timing of the output of the data queue can be controlled based on this prediction, including situations in which media content is proceeding through the data queue from the starting point, or is proceeding through the data queue from a point other than the starting point.

Herein, exemplary embodiments of a synchronization application capable of running on a variety of software platforms and operating systems (e.g., Android®, Apple® iOS®, etc.), as well as a system configured to perform a synchronization process, will be described. Although exemplary embodiments may be described with specific reference to certain operating systems hereinafter, it is to be understood that this is for convenience of explanation, and that these exemplary embodiments are not limited thereto.

Figure 2:
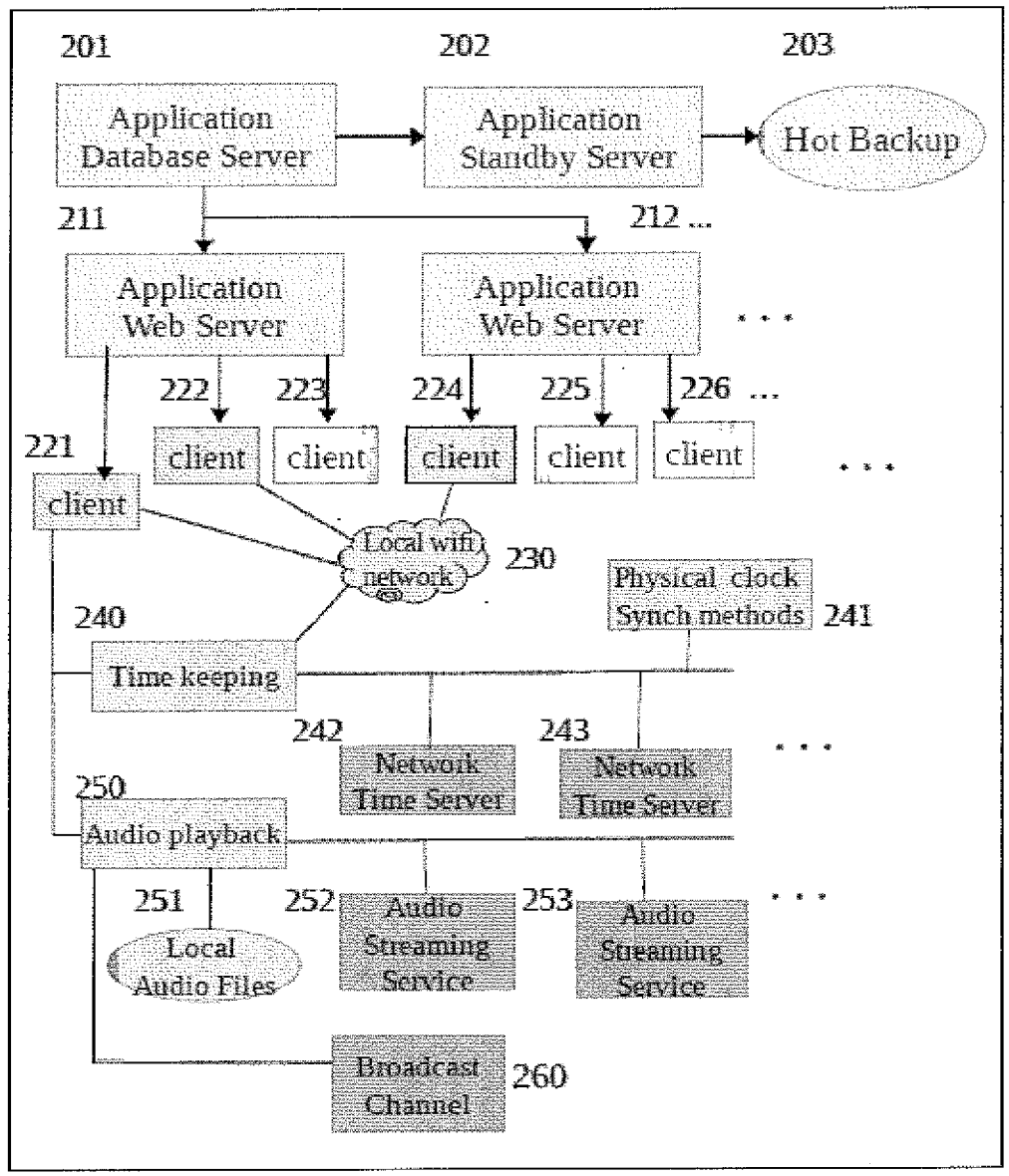
FIG. 2 shows the overall architecture of a system that facilitates the sharing of audio content, which enables synchronized playback on groups of client devices, according to an exemplary embodiment of the present disclosure.

FIG. 2 shows the overall architecture of a system that facilitates the sharing of audio content, which enables synchronized playback on groups of client devices, according to an exemplary embodiment.

The database layer includes a central server 201 backed up by a standby server 202, and a collection of hot backup files 203. Although FIG. 2 illustrates a centralized database, exemplary embodiments may utilize a distributed database. The database may store bookmarks and user profile information. A bookmark represents an audio stream that is currently playing or is scheduled to play in the near future. A bookmark may include the following fields, although the fields are not limited thereto:

A content identifier.
A millisecond offset into this content.
A time stamp declaring when this offset into this content should play.
A flag indicating if playback is paused.
A link to the user who posted the bookmark.
A description of the bookmark content.

A content identifier may be in a variety of forms. For example, for a local audio file 251, a file system path may be used, or for a streaming service [252, 253 . . . ], a url may be used. The content identifier may further be a hash value computed from the file contents, and used with a music recognition system.

A user profile may store information about the user's identity, demographic information, musical preference, social links to other users, etc.

The application web servers [211, 212, . . . ] serve as an intermediary between the client devices and the database. The application web servers accept client connections and may cache database information for the clients that are connected to them.

Client devices [221, 222, . . . ] may be any type of computing devices capable of playing digital audio including, for example, smart phones or tablet computers. Each client device may connect to one of the application web servers [211, 212 . . . ] and may also connect directly to other client devices through a local Wi-Fi network 230.

The synchronization application's output on a client device may be an audio signal, which may be transmitted by the client device to, for example, earphones, a public address system, a low power FM transmitter, a telephone conference call, or another external broadcast channel 260.

Each client device may include a user interface and a state management system, which communicate with the database through an application web server. The user interface may allow the user to browse through audio programs which may be available on his or her local device 251, and may interface with audio streaming services to which the user may have access [252, 253 . . . ], allowing the user to select some particular audio source for playback. The user interface may provide a search facility appropriate for each possible content location [251, 252, 253 . . . ]. In addition, the user interface may provide a means to browse through, search for, and select bookmarks from the database 201 via the web server 211. In addition to allowing searching by content identifier, timestamp, name and description, a bookmark may be located according using a variety of other types of information provided in the profile of the user who posted it.

Users may be linked in a graph of social relationships, and as a result, may have a collection of other users referred to as friends. Users may select a subset of their friends (e.g., a friend list) for friends having bookmarks they wish to monitor. When any of the bookmarks in the monitored friend list is updated on the server, the server will automatically send the updated bookmark back to all client devices which are monitoring it. This may be implemented using any type of server push technique including, for example, an AJAX technique referred to as long polling.

In some system configurations, a group of client devices may communicate with each other directly over a local Wi-Fi network, or through another file sharing network including, for example, a peer-to-peer (P2P) network. Each client may notify others of changes to its bookmarks using, for example, a direct network communication protocol including, for example a UDP broadcast packet. However, exemplary embodiments are not limited thereto. Bookmark updates received by the client device are processed by the client device's state management system. If the updated bookmark is not currently playing, the information in the friend list displayed by the user interface may be updated.

When a bookmark currently selected for playback changes, that change may be acted upon by the audio playback system 250. The state management system will determine which audio playback operations must be performed to implement changes such as, for example:

Pausing a currently playing selection.
Resuming a currently paused selection.
Skipping forward or backward in the current selection.
Switching to a new selection.

Each of these changes may be scheduled to occur at the timestamp specified in the bookmark. The audio system continues in its present state until this time. For example, if a user changes his or her bookmark to play a new selection one minute from a current time, the currently playing selection will continue until that time arrives. Synchronized audio playback is facilitated by first synchronizing time keeping 240 on the participating devices.

Some smart phones and tablet computers may already provide time keeping synchronized to their service provider, however, such time keeping may only be precise to around, for example, a quarter of a second, which may not be sufficient for synchronized audio playback. loss may be corrected by providing higher precision time keeping which is independent of the system time of day clock. For example, according to exemplary embodiments, time keeping may be based on the system monotonic clock, which measures the number of milliseconds that the system has been awake.

At start up, and whenever the clock needs to be re-synchronized, some program capable of determining the difference between the number of milliseconds that the system has been awake, and the number of milliseconds since the Unix epoch (midnight Jan. 1, 1970 gmt), will save this "offset" in memory. Whenever the application needs to get the current time, it will obtain the monotonic clock time and add the saved offset. In exemplary embodiments, to implement time keeping using the system monotonic clock, the system is prevented from going into a sleep state during which the monotonic clock does not run. In the Android® operating system, this may be accomplished by acquiring a "wake lock". Alternatively, the system could re-synchronize its clock whenever the system wakes up.

It is to be understood that although exemplary embodiments of the present disclosure are described herein with reference to utilization of the Network Time Protocol (NTP) to maintain clock synchronization among difference devices, a variety of time synchronization protocols may be utilized to maintain synchronization. For example, in addition to NTP, time synchronization protocols that may be utilized in exemplary embodiments include, but are not limited to, Time Protocol (TP), Simple Network Time Protocol (SNTP), and Precision Time Protocol (PTP). This, it is to be understood that herein, any reference to NTP may be substituted with another time synchronization protocol, including at least the time synchronization protocols listed above.

(NTP may be used to maintain clock synchronization on computers for an extended period of time. According to exemplary embodiments, a modified version of NTP may be utilized to obtain high precision time keeping. The modified NTP may be utilized on any computing device including, for example, mobile devices running the Android® or Apple® iOS® operating system. Rather than updating the system time of day clock, an offset may be maintained between the correct time of day and the millisecond uptime value. This may be implemented using an algorithm that queries a world wide network of official time servers [242, 243, . . . ] maintained for this purpose.

The NTP program may run in the background, and may return its current offset in response to queries sent to it over, for example, a socket connection. In an exemplary embodiment, the NTP program may be packaged as a service for the operation system (e.g., an Android® service) and may return its current offset in response to requests sent to in using standard operating system (e.g., Android®) inter-application communication techniques. If the latency inherent in the communication technique is low enough, the actual time of day may be returned instead of an offset.

A variety of strategies may be used for employing NTP to maintain the offset which provides the synchronization application, according to exemplary embodiments, with the high precision time utilized by the synchronization application. For example, according to exemplary embodiments, a service thread may query NTP periodically and update the offset, NTP may be queried and the offset may be updated before time critical events (e.g., posting or playing a bookmark), or NTP may be queried periodically during the playback of a long selection. In exemplary embodiments, NTP may be kept running for at least as long as the synchronization application is active or has a selection playing, or NTP may be ran briefly at startup, or only prior to time critical events.

To function, NTP may or may not have access to the worldwide network of time servers. For example, any device running NTP may itself become a time server. As a result, several devices connected only to a local Wi-Fi network 230 may use NTP to determine a private time standard common to them all. Further, the application servers [211, 212 . . . ] may be used to provide a time standard, either as NTP time servers, or though a custom designed method.

Client applications may also have custom designed algorithms which enable them to synchronize to each other. One such algorithm uses the SNIP (simple network time protocol) to obtain an estimate of the difference between the application time on the two devices based on an exchange of timestamps between them, and whose error is bounded by the time required for this dialog to complete in both directions (round trip time). This technique by itself may not achieve high accuracy because the round trip times are generally too large on the order of about 100 ms. However, by doing a large number of such estimates, and taking the intersection of the confidence intervals provided by each estimate, the accuracy can be improved to within about 5 ms to about 10 ms.

In addition, one client application may be designated as a local time server and use a variant of the "Berkeley Algorithm" to compute the offsets of for all the other devices, producing an "average time" in which errors between different devices can potentially cancel, resulting in higher accuracy.

Although exemplary embodiments utilize network techniques for synchronizing clocks, exemplary embodiments may also synchronize clocks using other techniques that do not utilize a network. For example, when the participating devices are all in close physical proximity to each other, physical clock synchronization methods 241 may be utilized. When these techniques are utilized, the clocks are first synchronized manually to within, for example, one minute, and then the clocks revert back to the top of the minute upon receipt of a common signal such as, for example, a hand clap or other sound, a light flash, a bump detected by the accelerometer of the device, etc.

Audio project use cases, and the implementation and options of the synchronization application according to exemplary embodiments of the present disclosure, will be described herein. It is to be understood that the implementation and options described herein are exemplary, and the present disclosure is not limited thereto.

Login/Account Management may include basic account creation, in which the user can create an account. To create an account, a user may be prompted to enter an email address, a password, an optional nickname, etc. In addition, a user may use his or her existing account for another service to create an account. For example, the user may create an account using his or her Facebook® or Twitter® accounts. When using a Facebook® account, the user is able to conveniently alert his or her Facebook® friends that he or she would like to share music with them in real-time. Further, when the user's Facebook® friends join using Facebook®, each user may be able to see each other's friend lists. The user may also post messages and comments directly to Facebook® from the synchronization application. When using a Twitter® account, the user may tweet directly from the synchronization application.

An auto-re-login option may allow the user to automatically re-log in when the synchronization application is opened using the last used credentials, if possible, unless the user cleared the credentials.

A friend management option allows users to find friends by searching for users by entering the user's entire nickname (or any email address associated with that user's account). When a user is found, the user is given an option to enter a friend request.

A friendship request option allows users to select a friend found via searching and send a friend request to that person. If the person accepts, the users are added to each other's friend lists.

A fast group friending option allows users to rapidly become friends with. For example, this option may allow friends to be connected based on being in the same geographic area, or selecting a fast group friending option within a specified time (e.g., 2 seconds) relative to one another. These options may further be based on whether users are all on the same WiFi network, close to one another, bumped devices, or shook devices near one another. QR codes or NFC tags may further be utilized for the fast group friending option.

A remove friend option allows users to drop profiles from their collection of friends. In an exemplary embodiment, the other user may or may not receive a notification, and is automatically removed.

A set one way friend feature allows certain high profile users (e.g., celebrities) to become friends with other users without the other user accepting the friendship (e.g., similar to a subscription service). The utilization of high profile users is described in more detail below.

Referring to active audio playing, a user may play audio by selecting a play option, and all of that user's friends may see what that user is playing. If other friends select that user, the other friends hear what that person is playing if they, for example, own that same music, have a subscription to a music playing service (e.g., Spotify®), etc. When the user selects a pause, mute or stop option, playback is paused, muted or stopped for all friends of the uses. When a phone call is received by the user, playback may be paused for all synchronized users during the phone call, and may resume in a synchronized manner upon the phone call being terminated.

A follow feature allows for selecting a friend to follow from a friend list view when the friend is listening to something, the users hear the same song, etc. Synchronization between the users at a high level may be implemented in this scenario according to exemplary embodiments of the present disclosure.

According to exemplary embodiments, the synchronization application may include digital rights management (DRM) implementations to protect against piracy. For example, existing third party DRM providers and services may be utilized with the synchronization application, or the synchronization application may utilize proprietary DRM implementations. Further, the synchronization application may utilize existing third parties to handle all monetary transactions (e.g., credit card payments). Further, exemplary embodiments may utilize software obfuscation technology and digital certificates for authentication. Digital certificates may be utilized to allow the server to validate that it is speaking to a genuine client employing, for example, challenge and response authentication techniques. Authentication techniques may include, for example, support for the hiding of quoted values in the code, support for self tamper detection, etc.

Figure 5:
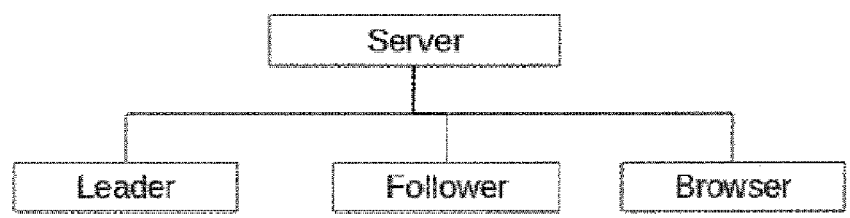
FIG. 5 shows application architecture of the synchronization application, according to an exemplary embodiment of the present disclosure.

FIG. 5 shows application architecture for the synchronization application, according to an exemplary embodiment of the present disclosure.

According to an exemplary embodiment, the synchronization application may include a server and a client which may switch between three roles: leader, follower, and browser.

Leaders provide content. The content may be in the form of, for example, a bookmark which describes the leaders position in a media file at a particular time: (e.g., id, offset, datetime, etc.). The id may be, for example, a filename a hash, etc., which allows identification of the file by its content.

Followers receive updates from one or more leaders. When any of the selected leaders change their media file or their offset into the media files, the follower will receive an updated bookmark. A follower may choose to listen along with any of his or her leaders by selecting a play option associated with that leader. The leader's bookmark describes, for example, where the leader was at a particular time in the past. The client application may recalculate the starting offset based on a future time sufficient to allow for the startup of the music player at time when the play option is selected (e.g., when a play button is clicked).

Browsers are clients that are exploring, and may become leaders or followers. To become a leader, a browser registers a playlist, start time, name, and description. To become a follower, a browser may perform a keyword search using a playlist name and description, or may perform a query using a social network relationship.

Transactions performed utilizing the synchronization application are described herein. It is to be understood that the transactions described are exemplary, and the synchronization application is not limited to these transactions.

Connect Messages from Client to Server

A browse transaction refers to a request to become a browser. If a session record does not exist for this client, a session record is created, or an existing record is updated to reflect that this client is now a browser. The default search may be started and run asynchronously. The new session id is returned to the client, which will then issue a retrieve message to the server.

A follow name transaction refers to a request to become a follower. The specified name may be, for example, a user name or a playlist ID. When the specified name is a user name, the name is converted to the next playlist by the specified user to start up. The new session ID will be returned to the client, which will then issue a retrieve playlist message, which will display the playlist information and request permission to begin following.

A lead name transaction refers to a request to manage content as a leader. The specified name may be the user name of the leader. In a production system, one or more methods may provided for the user to authenticate as this user name. All content may be posted publicly or anonymously. Users may connect with a particular leader name, and edit all content posted under that name. Content posted under an authenticated leader name may also include, for example, a user ID, and only users who can authenticate as this user ID may edit content posted under this user ID. A new session ID may be returned to the client, which may then issue a my playlists message, which will retrieve all of this leader's playlists and allow the user to select one to edit or follow.

Messages from a Browser Client to a Server

A search QueryText transaction is a request to run a query. QueryText may include a plurality of fields (e.g., field:value, field:value, etc). Here, 'field' is one of the fields in the playlist table. Each field:value pair for a text field may be converted to an SQL "like" statement in which spaces are converted to % signs, the result being a search for records containing the specified substrings in the order in which they are listed. The search may be conducted asynchronously. A session ID may be returned to the client, which will then issue a "retrieve" message to the same server.

A Retrieve BlockInfo transaction is a request to retrieve results. BlockInfo may be, for example, 3 integers: offset, position, slots. Here, offset denotes the sequence number of the desired item in the result set, slots is the maximum number of items to return, and position is the slot in which to place the selected item in the returned results. If no results are available, an error is recognized. Offsets can be specified as absolute, or as relative to the offset of the first item in the previous returned list. Relative offsets may be distinguished by starting with a + sign.

A Select Offset transaction is a request to follow the playlist at the specified offset in the results list. The offset may be absolute or relative, as described above. The server may automatically issue the appropriate "follow" message, and forward the response to the client.

Messages from a Follower or Leader to Server

A Retrieve Playlist transaction is a request for the specified playlist. All playlist fields may be returned to the client. The client may display this information to the user, and make a query to the user for confirmation that the user wants to follow this playlist now. If the user responds yes, a Follow Playlist message will be sent to this same sever.

A Follow Playlist transaction is a request to begin following the specified playlist. The server may return the filename of the file to be played along with the offset at which to begin playback and the time at which to begin playback to the client. Upon receipt of this information, the client will display a countdown to the start time, and then begin playback.

Messages from Leader to Server

A myPlaylists transaction is a request for all playlist names belonging to the current user. This list may not be paginated, and all playlists may be returned.

A deletePlaylists transaction is a request to remove the specified playlist. An error is recognized if the specified playlist is not owned by the current user, or if any users are currently following it. Otherwise, the playlist may be removed.

An UpdatePlaylist, Text transaction is a request to update the specified playlist. Text provides new values for all fields. Fields not mentioned will be unchanged. An error is recognized if the current user does not own the playlist or if information (e.g., a file name or start time) was changed that followers might not have enough time to discover.

A newPlaylistText transaction is a request to create a new playlist from the specified text. The server may create the playlist and return its generated unique id to the client.

Data may be provided in, for example, a postgres database.

Figure 6:
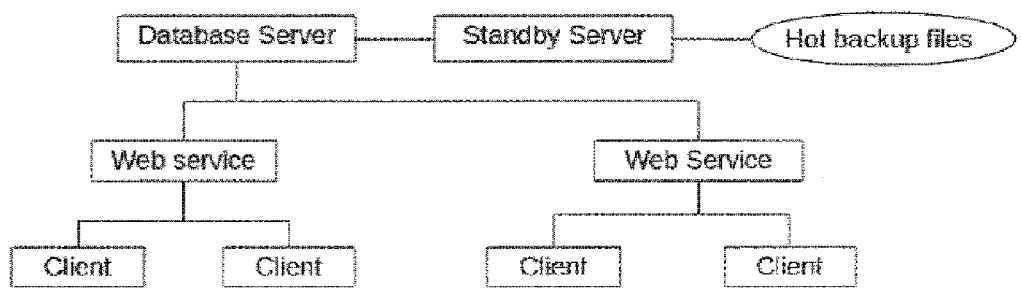
FIG. 6 shows system architecture of the synchronization system, according to an exemplary embodiment of the present disclosure.

FIG. 6 shows system architecture of the synchronization system, according to an exemplary embodiment of the present disclosure.

According to an exemplary embodiment, the system for performing synchronization may include two types of servers, and one or more types of client.

For example, a Database/Standby Server (e.g., a pair of Amazon® EC2 instances running Ubuntu Linux® and the postgres database management system) may be configured with log shipping so that the write ahead log of the active server is continually shipped to the standby server, which operates in continuous recovery mode until a failover is detected, at which time it becomes the primary server, and a new standby instance is created. In addition, the standby server archives the log files and backs up its database files periodically to, for example, an EBS volume. When a new standby is created, its database is restored from this backup, before beginning to receive log files from the primary server. Postgres 9 provides a "streaming replication" feature that may be utilized to implement this process. In an exemplary embodiment, no application code is stored on the database server (e.g., in an exemplary embodiment, only the database and replication scheme are stored on the database server).

An application web service (e.g., one or more EC2 instances running Ubuntu Linux and Tomcat) may be utilized. In an exemplary embodiment, Tomcat may not be used to serve HTML, but rather to operate as a web service, receiving commands in the form of HTTP GET and POST requests, and returning JSON objects. Only those commands having a "text" attribute representing an edited object may be implemented as POST requests (e.g., update and newPlaylist). The web service may open connections on the database server using JDBC. Web services may be created and destroyed to adjust to varying system loads, using, for example, the Amazon® load balancing service.

Clients may be written in any language and on any platform. The clients may present and collect the information contained in the transactions, issue the appropriate http commands, and consume the returned JSON data. Javascript may be utilized.

Herein, a synchronization application according to an exemplary embodiment will be described. The synchronization application may be designed to be utilized with, for example, a device running the Android® operating system or the Apple® iOS® operating system, however, exemplary embodiments are not limited thereto. The synchronization application is capable of synchronizing playback of audio files, in cooperation with a server which provides scheduling information. It is to be understood that although an exemplary embodiment is described herein with reference synchronization of audio files among mobile computing devices running the Android® or iOS® operation system, exemplary embodiments are not limited thereto. For example, exemplary embodiments of the present disclosure may be utilized with any type of data queue or buffer (e.g., a data queue or buffer storing non-media data), and any type of device that accesses a data queue or buffer (e.g., devices other than mobile devices).

When the synchronization application is utilized with the Android® operating system, the built-in audio playback system of Android® functions as a data queue. Thus, when reference is made to a data queue in the context of the Android® operating system, it is to be understood that reference is being made to the audio playback system within Android®. In an exemplary embodiment, the audio in the "data queue" in Android® may be processed from a sound file (e.g., a compressed or uncompressed sound file) received as input to sound waves transmitted as output.

System Context

Figure 7:
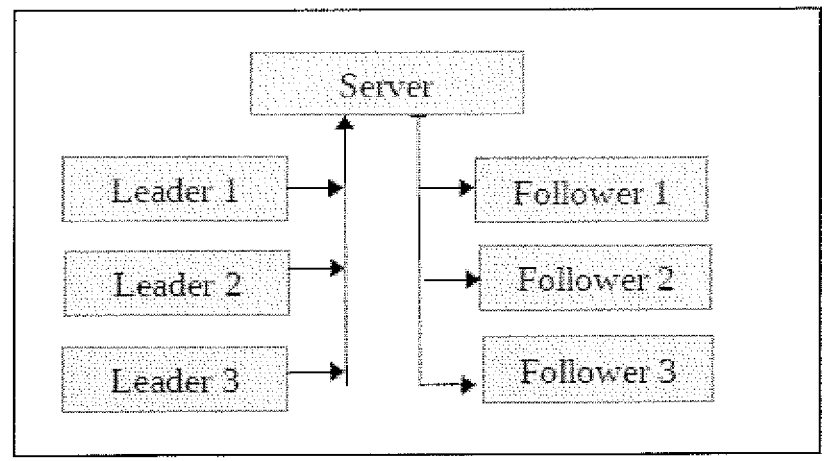
FIG. 7 illustrates system context of the synchronization system, according to an exemplary embodiment of the present disclosure.

FIG. 7 illustrates system context of the synchronization system, according to an exemplary embodiment of the present disclosure.

The system may include a server and several clients. The client devices may be, for example, Android® or iOS® smart phones or tablet computers, however, the client devices are not limited thereto. For example, in this embodiment, the client devices may be any device capable of interacting with a server and playing digital audio. For convenience of explanation, exemplary embodiments will be described herein with reference to the Android® operation system, however, exemplary embodiments are not limited thereto.

Each client device is associated with a user profile and a bookmark. The user profile contains identifying information for each user and a network of social relationships between users.

A bookmark contains a content identifier, an offset (e.g., a millisecond offset) into that content, the millisecond duration of that content, a time indicator (e.g., a timestamp declaring when that offset into that content should play), and a flag indicating whether playback is paused, as well as a name, description, and a link to the profile of the user who posted it. Users may search for bookmarks based on the name, description, and any of its user profile information, and may select a collection of bookmarks to monitor, and one of the monitored bookmarks to play.

Users who have bookmarks posted which are currently playing or are due to play in the near future are leaders. Users who have selected one of more bookmarks to monitor are followers. Followers may be notified when any of their monitored leaders change his or her bookmark. If this bookmark is not playing, new information may be displayed in the client device's user interface. When the updated bookmark is playing, commands must be sent to the media player to affect the change of state represented in the bookmark.

Client Architecture

Figure 8:
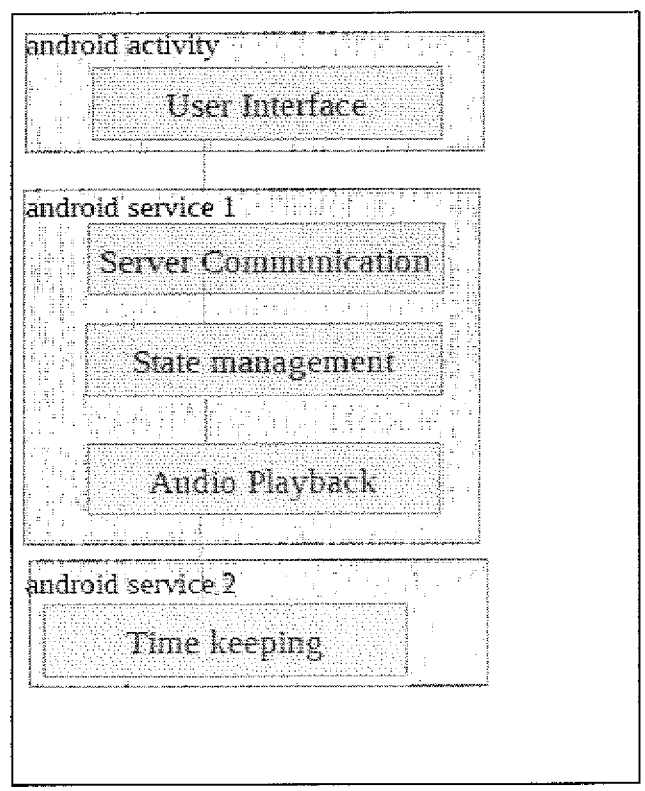
FIG. 8 illustrates client architecture, according to an exemplary embodiment of the present disclosure.

FIG. 8 illustrates client architecture, according to an exemplary embodiment of the present disclosure.

The user interface may provide controls enabling users to do the following:

1. Browse and select available leader bookmarks for monitoring.

2. Browse and select monitored bookmarks for playback.

3. Browse and select available audio files or streams for playback.

4. Pause/resume, skip forward or back within a file or stream.

5. Determine whether the currently playing selection will be posted on the server as a bookmark, and if so, control which other users may access it.

6. Enter search criteria to filter any of the "browse" results.

7. Edit the current user profile and friends lists.

The server communication component may provides a "request" and "response" method for each transaction carried out with the server.

The state management component may control audio playback in response to bookmark changes. When leading, these bookmark changes will originate in the user interface. When following, these bookmarks will originate in a server response.

The audio playback components provide the ability to access and play audio data. There may be one output component and potentially several input components. The output component is the scheduledAudioPlayer, which contains algorithms that ensure that data from the input components is presented to the underlying audio system, so as to appear as sound at the scheduled time, with a precision of, for example, about 10 ms to about 20 ms. This component may accept non-encoded 16-bit stereo at about 44100 samples/sec. The input components are responsible for accessing content and presenting it in this form to the output component. There may be different input components that access input from different sources and in different formats. Input components may implement, for example, the "javaio.InputStream" interface, with appropriate buffering so that the output component will never need to wait for input.

The time keeping components may provide a time of day clock which is accurate to within about, for example, 10 ms, or allows a leader and all his followers to establish a private time standard with a high level of accuracy. Although an NTP protocol may be utilized, exemplary embodiments are not limited thereto. For example, according to exemplary embodiments of the present disclosure, a modified version of NTP, which may be packaged as a separate application, and will maintain an offset between the devices' internal uptime clock and the best time available from the global network of NTP time servers, may be utilized. The modified NTP protocol may be within, for example, about 10 ms over the internet, and within, for example, about 1 ms for time servers available on a local network. Additional synchronization methods which set the time on receipt of a common physical signal such as, for example, a hand clap, light flash, or bump may also be provided.

Transactions

Each of the functions of the user interface may be carried out as follows.

(1) A UI component calls a request method in the communications component.

(2) A request is sent to the server (or an asynchronous method on the client) and a response is received.

(3) The response method in the communications component calls a method in the state management component for a change of state.

(4) The state management component may make calls to the audio playback component.

(5) The state management component makes a callback to the UI on the UI thread to
cause the change in state to be reflected in the UI. This may be accomplished using "view.post(runnable)" or "activity.runOnUiThread(runnable)"

User Interface Operations

Exemplary embodiments of the user interface may provide the following operations, however, exemplary embodiments are not limited thereto:

(1) Query Files by Title: The UI may obtain a list of audio files available in the local media library wherein the title matches the first few characters typed in a text box.

(2) Query Files by Artist: The UI will obtain a list of audio files available in the local media library wherein the artist name matches, for example, the first few characters typed in a text box.

(3) Query Streams by Service and Title or Artist: The UI will obtain a list of remote audio streams available via a specific streaming service, and who's title or artist matches the first few characters typed in a text box. This involves issuing a query to the remote streaming service, and may be facilitated by an external module.

(4) Select File or Stream for Playback: The UI will accept the selected element of the list presented by (1) to (3) above, and will set the content identifier for the user's bookmark to the selected file or stream. The offset in the bookmark will be set to zero, indicating "play from the beginning", and the timestamp will be set to several seconds in the future to allow followers time to retrieve the new bookmark and start playback. It will then call the "updatebookmark" request method in the server communications component, which will update the bookmark on the server. Upon success, the corresponding "response" method will be called in the server communication component, which will make a call on the UI thread to request that the UI display the "play" screen. It will also make a call to the state management component which will notice which fields have been changed in the bookmark, and will call the appropriate methods in the audio playback component to carry out the change of state.

(5) Query Bookmarks by Title/User/Description: The UI will call the query bookmarks method in the server communication component. It may pass a query looking for a partial match on the title of the bookmark, or user name, or looking for specific words in the description field. These queries may also look for bookmarks due to play in a specified time interval, and are in a specified percent complete range.

(6) Select Bookmark for Monitoring: The UI will display the list of bookmarks retrieved in (5) above, and allow bookmarks from the results list to be selected for monitoring. It will also allow currently selected bookmarks to be de-selected. Upon completion, the "edit monitored bookmarks" in the server communication component will be called to implement the indicated change on the server. This will result in a call back to the corresponding "response" method in the server communication component, which will make a callback to the UI thread to update the information about the monitored bookmarks in the UI. If there is currently a bookmark playing, the state management system will check this bookmark for changes and make the appropriate calls to the audio playback system for any required change. If any bookmarks are in the monitored list, a request to retrieve that list will be present as soon as a response is received, implementing a "long-polling" method of monitoring the list for changes.

(7) Select Bookmark for Playback: Only bookmarks in the monitored list can be selected for playback. Upon selection, a request to retrieve the selected bookmark from the server will be sent to the server communication component. A call back will occur on the corresponding "response" method. As above, the received bookmark will be compared to the currently playing bookmark (if any) by the state management component. This will result in the audio source identified in the bookmark being started in the audio playback component, or result in that component switching from the current content to the new content at the scheduled time.

Exemplary embodiments may be based on the "Phonegap" framework. This framework allows an application to be developed using javascript and html, which provides a degree of platform independence. For example, this implementation will work on both Android® and iOS® devices with the use of Phonegap plugins, and will allow for interfacing to standard Android java classes (e.g., my ScheduledAudioPlayer), or C programs with JNI wrappers (e.g., Timekeeeping staff).

When the synchronization application is running on an Android® device, the application may not function when not actively displayed. For example, if the user starts playing audio and then begins working in another application, bookmark updates may no longer be received from the server, since the server communication and state management components are part of the activity. Further, the synchronization application may be terminated by Android® in a low memory situation. To remedy this situation, exemplary embodiments may implement the user interface of the synchronization program as an Android® activity, and place the rest of the synchronization application in an Android® service. The NTP timekeeping component may be implemented as a separate Android® service. Both services may be started automatically when the UI activity is loaded. The UI activity may include a "shutdown" option which stops the services along with the UI itself.

Exemplary embodiments may utilize the Android® "content provider" (e.g., "android.provider.MediaStore") for accessing media files input from the device's media library. Further, the synchronization application may utilize common hardware or software buttons on the client device such as, for example, the volume control and media playback controls. For example, to utilize the volume control, the Android® "setVolumeControlStream" method may be used to select the "Music" stream as the target of the volume control in the "onCreate( )" method of the Activity. To allow playback to be controlled by the standard media control keys on the handset or headset, an Android "Broadcast Receiver" may be provided. This receiver will respond to Android "Intent" objects having the action "Intent_ACTION_MEDIA_BUTTON". To determine which button was pressed, "intent.getParcelableExtra(Intent.Extra_Key_Event).getKeycode( )" may be used, and the appropriate call to the state management component may be made.

Android® Activity

The Android® Activity component contains the user interface. The Phonegap framework creates the Android® Activity component automatically from the supplied HTML and javascript. In exemplary embodiments, one activity may have different screens being represented as different sections of the DOM, which are shown or hidden as necessary to navigate from screen to screen.

The UI activity may utilize the "ContentResolver" to select the available audio files on the device using constants specified in the "android.provider.MediaStore.Files" interface.

Connecting to a Service

The synchronization application may use two services: a local service which provides the bulk of the synchronization application, and a remote service (running in a separate process) providing the timekeeping function. Exposing methods in a service, whether local or remote, may include the following:

(1) The service object contains an inner class which extends "Binder".

(2) To connect to the service, the client object calls Context.bindService(Intent, ServiceConnection, flags).

(3) The "ServiceConnection" is an inner class in the client object, which contains two methods: onServiceConnected (ComponentName, IBinder) and onServiceDisconnected (ComponentName). The IBinder passed to "onServiceConnected" will be the "Binder" defined in the service object.

(4) For a local service, the "Binder" may contain a method that returns the service object itself. The client can use this to capture the service object during the onServiceConnected call, and use it as if it had been instantiated directly.

(5) For a remote service, the client may use one of the interprocess communication techniques: (5.1) The Binder "transact" method, (5.2), the Messenger/Handler interface (5.3), or the Aidl ("android interface definition language") custom interface facility.

Android® Service 1

A first service, referred to herein as Android® Service 1, may include a large portion of the synchronization application, and may include, for example, the server communication, state management, and audio playback components. The service may be started by and bound to the user interface. In an exemplary embodiment, specifying "android:exported=false" in the manifest entry for this service results in the service not being started or bound by any other application. In an exemplary embodiment, the service is started rather than being bound by the UI. As a result, the service continues running, even when Android® destroys the UI to reclaim memory. The UI component may include a "stop" or "quit" button, which will explicitly stop this service, and then stop itself. This component may post a notification in the status bar which will indicate the state of audio playback, and when playing, may display the percentage of the current file played.

Since the service is a local service, the service object itself can be obtained from the binder and used directly.

The service may use the "Media" content provider to obtain the list of audio files on the device. In an exemplary embodiment, the service may utilize a special content provider for each streaming service to obtain a list of available streams. Audio input components can access data from the content provider and decode it to the standard form expected by the "scheduledAudioPlayer".

Android Service 2

A second service, referred to herein as Android® Service 2, encapsulates the NTP time resolution capability. This service may be bound by the previous service (Android® Service 1), and may be exported, with an intent filter which allows it to be bound by other applications as well. Since it is bound without an explicit start, it may be terminated automatically when all components binding it have been terminated. This service exposes "getOffsetFromUptime( )", which returns a integer which, when added to the value of the system uptime clock, yields the current application time in milliseconds since the epoch. Additional methods that might be exposed are, for example, methods that return the uptime clock, standard system time, and/or the application time. These additional methods may have different latency inherent in their execution.

In an exemplary embodiment, the second service may be implemented as a remote service, and one of the IPC methods may be utilized to communicate with the service. For example, the binder "transact" method call may be utilized. In this embodiment, the client retains the IBinder instance provided to the onServiceConnected( ) method, and may call ibinder.transact(code, in_parcel, out_parcel, flags) to initiate the transaction. Code in an integer representing the "getOffsetFromUptime" function "in_parcel" is a parcel object which is empty, as no data is being passed to the service. "Out_parcel" is also an empty parcel object into which the service may insert its current value for the offset from system uptime value to application time.

Using Haxe for Platform Independence

In an exemplary embodiment, certain components may be implemented using Haxe, however, exemplary embodiments are not limited thereto. For example, the user interface may be developed using html and javascript using the Phonegap framework. The server communication and state management components may comprise Haxe applications. These components may run as background services, and may perform functions that are platform independent. The audio playback functions may be implemented such that they are native to each platform. The main timekeeping component NTP may be, for example, a C program contained in a platform dependent wrapper. The interface to the timekeeping component may be located in the "synchronizedAudioPlayer", and may be platform dependent. Auxiliary time synchronization methods based on a local physical signal such as, for example, a sound, light, or bump, may be implemented in Haxe.

iOS® Implementation

Figure 9:
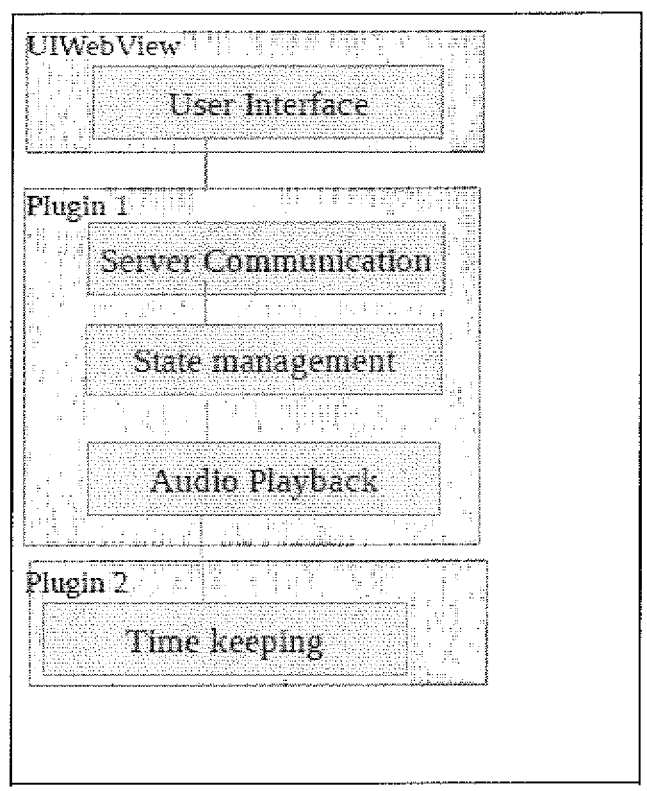
FIGS. 9 and 10 show an overview of an iOS® implementation of the synchronization application, according to exemplary embodiments of the present disclosure.

FIG. 9 shows an overview of an iOS® implementation of the synchronization application, according to an exemplary embodiment of the present disclosure.

Phonegap allows the user interface to be coded using html and javascript. The same code may be used in iOS® as for Android®, however, in addition, Phonegap may be used to create a UIWebView object rather than an Android® activity. The main body of the synchronization application, including the sever interactions, state management system, and audio playback controller, may be implemented as Phonegap plugins.

Start-Up Procedure for Synchronized Audio Playback

The synchronization application may be described as having three phases: a start-up phase (e.g., a handoff phase), a transition phase, and a playback phase.

Figure 1:
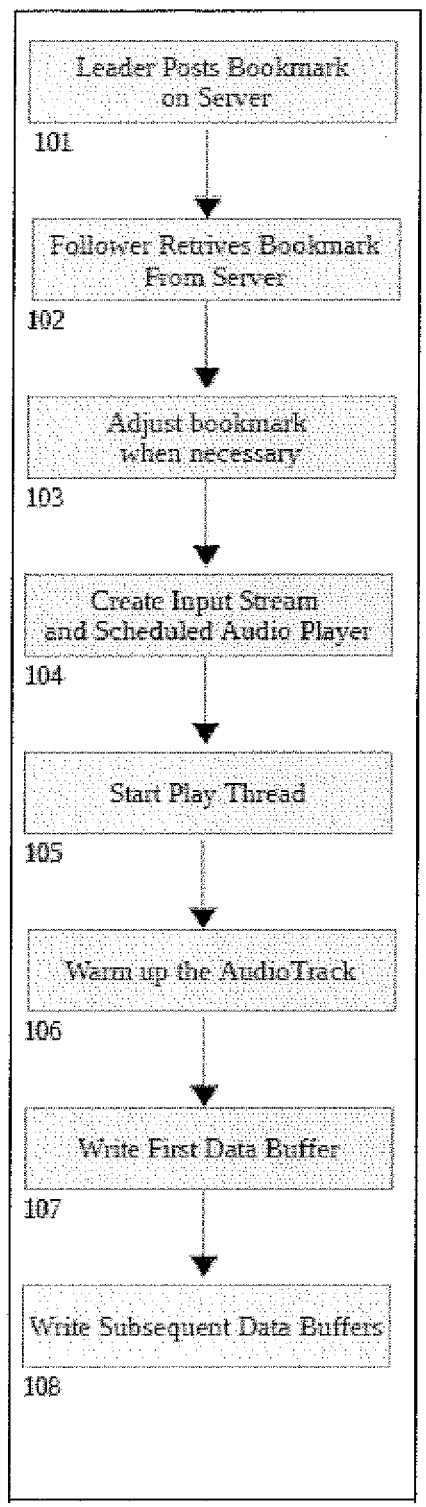
FIG. 1 shows an overview of the start-up phase of the synchronization application, according to an exemplary embodiment of the present disclosure.

FIG. 1 shows an overview of the start-up phase of the synchronization application, according to an exemplary embodiment of the present disclosure.

The start-up phase is described herein with reference to FIG. 1. The method described herein may be utilized by the audio playback system 250 to overcome the variable latency inherent in starting playback. For convenience of explanation, FIG. 1 may be described with reference to the Android® operating system, however, it is to be understood that exemplary embodiments are not limited thereto, and that the synchronization application and the description of the start-up phase herein are not limited to the Android® operating system. It is further to be understood that although the method described with reference to FIG. 1 describes the synchronization of audio playback, the method of FIG. 1 may be utilized with any type of data stored in a data queue or buffer, including, for example, non-media data.

At block 101, a user (e.g., a leader) selects an audio source present on his or her device, or available from a third party streaming service. Once the user initiates playback (e.g., the user presses a "play" button), a bookmark may be created on the server. The bookmark identifies the audio source, includes an offset (e.g., a millisecond offset) into the source, and includes a timestamp declaring the point in time that this offset into the source should play. When starting a new audio source, the offset may be zero, and the timestamp may be several seconds in the future.

At block 102 another user (e.g., a follower) selects this leader from his friend list and begins playback (e.g., by pressing the play button). This causes the bookmark to be retrieved from the server. If the follower is joining at the beginning, the timestamp in the bookmark will be far enough in the future to allow for all start-up processing. However, if the follower is joining the program late, the bookmark is adjusted at block 103. When the bookmark is adjusted, its offset and timestamp will both be increased by enough time (e.g., in milliseconds) to put the timestamp far enough in the future to allow for start-up, and the follower may miss the beginning of the audio program.

The time required for start-up may be reflected in two integers which can be configured as necessary for different devices. For example, the (1) lead time is the time allowed to initialize input and output components, and (2) device latency is the time needed for the first sample in a newly written buffer to appear as sound.

At block 104, the input and output objects are created. After block 104, processing for the leader and the follower may be the same. The input component may be a "java.io.InputStream" specific to the type of audio source being consumed. It is the function of this component to retrieve data from the audio source and convert it to the format expected by the output component. The output component is a "ScheduledAudioPlayer." This component reads from the input stream and writes to an "android.media.AudioTrack" object which provides an interface to the underlying audio subsystem.

The constructor for the ScheduledAudioPlayer may accept 3 parameters: the "lead time" and "device latency", as described above, as well as a "minimum buffer size." The constructor creates the android.media.AudioTrack object that will be used for output, and allocates its input and output buffers. The buffer size will be the larger of our configured minimum size, and the minimum size reported by the AudioTrack object. The AudioTrack may be configured to play non-encoded, 16-bit stereo, at 44100 samples/second. The InputStream may convert the input to this format.

The input buffer may be allocated in bytes and the output buffer may be allocated in short integers, however, exemplary embodiments are not limited thereto. For example, a sample may consist of 2 short integers, one for each of the left and right channels, corresponding to 4 bytes of input. Thus, the number of bytes corresponding to a duration in milliseconds may be expressed as, for example: bytes=4000*duration/sample_rate. This may be used to calculate the buffer duration (e.g., the time required for one buffer to play at the configured sample rate), which is utilized to achieve and maintain synchronized playback.

At block 105, the play thread is started. For example, a new java thread may call the play method on the ScheduledAudioPlayer. This method may accept 3 parameters: the InputStream, the starting offset (e.g., in milliseconds), and the scheduled start time.

The play method begins by converting the specified offset to bytes, and skipping this many bytes from the input stream (e.g., bytes may be sequentially discarded, or an indexing scheme may be used to find the starting point in an efficient manner). The method then reads the first input buffer, and invokes the garbage collector. If, at this point, the scheduledStartTime is more than leadTime+deviceLatency milliseconds in the future, the play thread may sleep until scheduledStartTime-leadTime-deviceLatency.

At block 106, the audio track is "warmed up." For example, several buffers of silence (e.g., dummy data) may be written to the audio track to consume the time remaining until the scheduled start time. The times at which these buffers are accepted by the audio track can be used to determine how much silence (e.g., how many milliseconds) is to be inserted to ensure that the audio data plays on time. This process is guided by two assumptions: (1) once the audio track's internal buffers are filled, the time required for the first sample in a newly written buffer to appear as sound is on average given by our "deviceLatency" parameter, and (2) once the audio track's internal buffers are filled, it will accept a new buffer only when a previous buffer finishes playing.

For example, let "n" be a sequence number of the newly written buffer, and postWriteTimestamp(n) be the current time after the buffer was accepted by the audio track. Denote the number of additional milliseconds needed to occupy the media player until the scheduledStartTime as padding(n). The first assumption allows for padding(n) to be estimated in terms of the postWriteTimestamp as, for example: padding(n)=scheduledStartTime-deviceLatency-postWriteTimestamp(n). The second assumption allows for an estimation to be made in terms of the previous estimate as, for example: padding(n)=padding(n−1)−bufferDuration. This allow each buffer of silence written during the available lead time to contribute to a running average, which may even out irregularities in the actual latency, given that the first assumption is only true on average, and actual latency fluctuates.

Referring to the equation averagePadding(n) ((n−1)*padding(n−1)+padding(n))/n, when the averagePadding calculated is less than a bufferDuration, the first data buffer may be written at block 107. The insert pointer for the output buffer will be placed at an offset of "averagePadding" into the output buffer, and data will be transferred until the output buffer is full, at which time the output buffer will be written to the audio track. After the first or any subsequent data buffer has been written, the offset into the input stream, which should be playing, may be calculated in two ways: (1) based on the interval elapsed since the scheduledStartTime, and (2) based on the number of data buffers written. For example:

1. postWriteTimestamp scheduledStartTime−deviceLatency 2. previousDataBuffersWritten*bufferDuration−padding−deviceLatency When these equations are set to be equal to each other, the following equation may be obtained:

3. padding−scheduledStartTime−postWriteTimestamp+previousBuffers*bufferDuration

Referring to the above equation, when padding is positive, it represents an amount of time (e.g., a number of milliseconds) of output that has been added to the input stream. When padding is negative, it represents an amount of time (e.g., a number of milliseconds) of input that has been skipped. The padding added a the beginning of the first buffer is positive and consists of silence. After the first buffer is written, the running average of the expected padding requirement will continue to be maintained. In an exemplary embodiment, the new value may be given a weight of $\frac{1}{8}$ and the old average $\frac{7}{8}$ to simulate keeping an average only of the most recent 8 values. After the first data buffer has been written, and its post write padding estimate has been appended to the running average, subsequent data buffers may be written at block 108. After each subsequent output buffer has been written, the estimated required padding may be calculated using equation (3) as described above, and may be appended to the running average.

After each new input buffer is read, the new running average of the padding requirement is compared to the padding currently in place. If it is smaller, the padding will be reduced by skipping a number of bytes of input equivalent to the millisecond excess of the current padding. When it is larger, the padding will be increased by copying a number of bytes equivalent to the millisecond deficiency of the current padding from the top of the input buffer to the output buffer twice. Any correction larger than a buffer duration will be limited to a single input buffer. If a discrepancy persists, it may be resolved by several corrections.

Timely Response to Bookmark Updates

Figure 3:
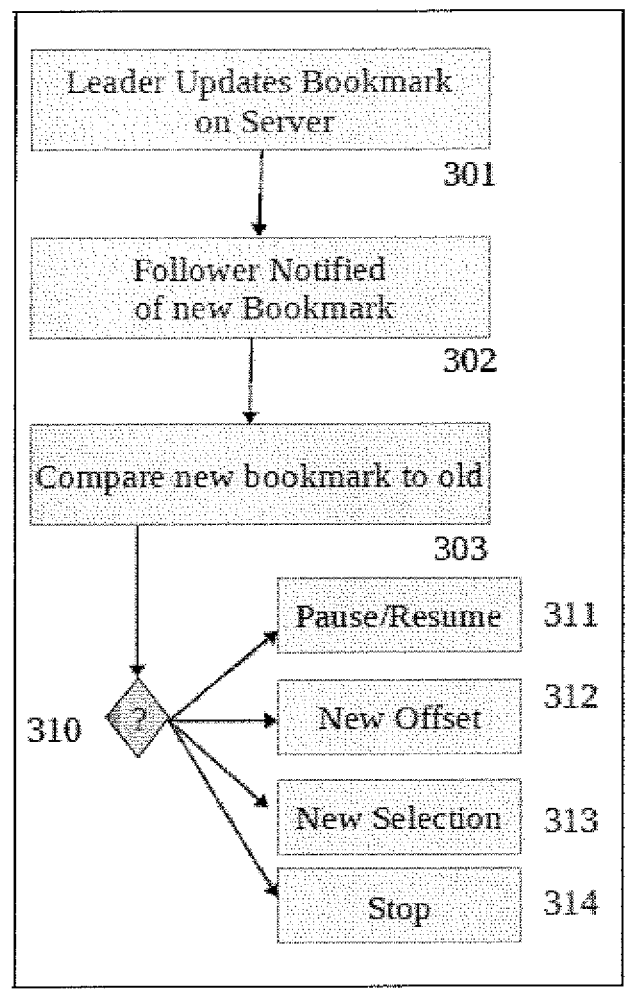
FIG. 3 shows an overview of a method of responding to bookmark updates, according to an exemplary embodiment of the present disclosure.

FIG. 3 shows an overview of a method of responding to bookmark updates, according to an exemplary embodiment of the present disclosure.

The user interface may provide leaders with several ways of updating their bookmark. For example, a "play next" operation may schedule a new selection to play when the current selection finishes. A "fast forward" operation may enable a section of the input stream to be skipped, and a "repeat" operation may enable the section to be replayed, including replayed in a loop. Playback may also be paused and resumed. Additional operations may also be utilized.

When the leader requests any of these operations, an updated bookmark will be posted on the server at block 301. Followers are notified of the new bookmark via a server-push technique such as, for example, ajax long-polling, at block 302. When the new bookmark is received, it is compared to the one currently in place at block 303. Bookmark changes may use one of more of the following actions by the audio playback system: pause/resume (block 311), new offset (block 312), new selection (block 313), or stop (block 314). For example, a stop operation may be requested by the leader removing his or her bookmark from the database. Unlike the other operations, the stop operation may not be scheduled, and can be acted upon as soon the dropped bookmark is noticed.

In an exemplary embodiment, a "paused" state may not be included. Rather, a "stopped" state may be utilized, and all bookmark changes could be implemented by stopping the previous playback and starting anew. In this embodiment, the lead time and device latency, as described above, may be utilized.

Implementing a timely response to bookmark changes allows for the avoidance of overhead, which may result in a new selection immediately following the previous selection, seamless skips and loops being created, and pause/resume operations occurring in real-time, or substantially in real-time.

Playback from one input stream may be "banded off" to another at a specified time. As a result, an entirely new selection can be substituted. This new selection may be, for example, total silence, affecting a pause operation, or the previous input, affecting a resume operation. It may also be the same input source positioned at a different offset. This is described in further detail with reference to FIG. 4.

Procedure for Synchronized Replacement of Audio Source

Figure 4:
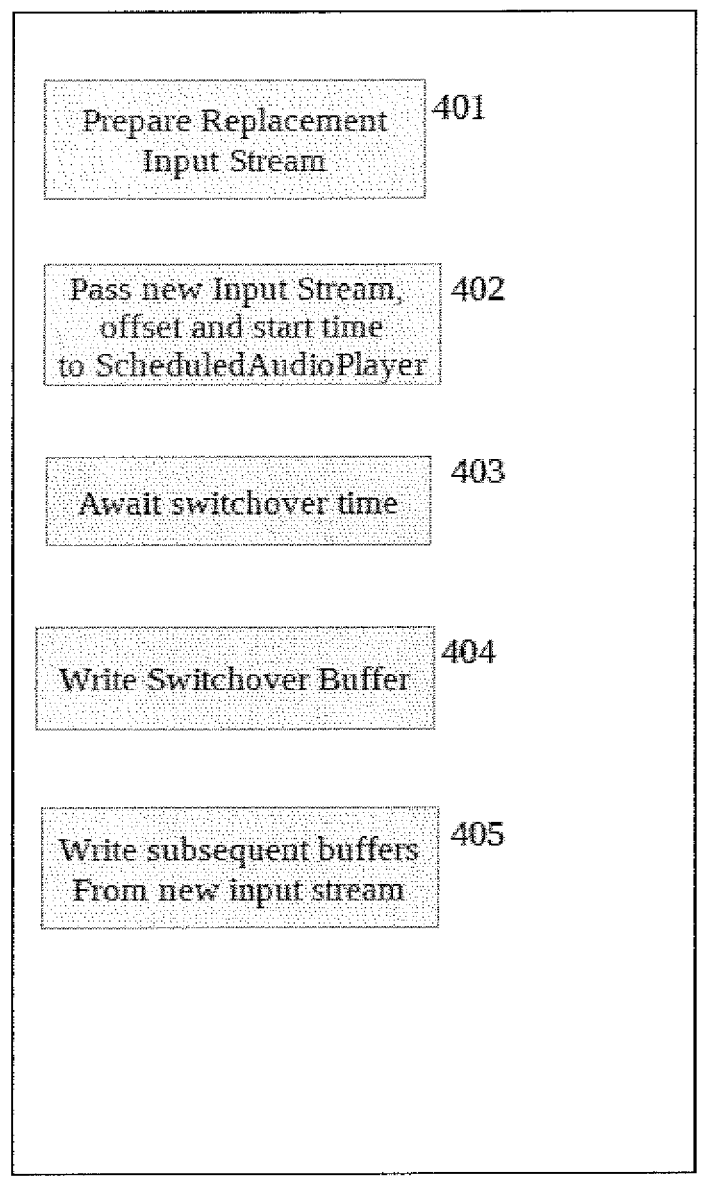
FIG. 4 shows an overview for the synchronized replacement of an audio source, according to an exemplary embodiment of the present disclosure.

FIG. 4 shows an overview for the synchronized replacement of an audio source, according to an exemplary embodiment of the present disclosure.

At block 401, a new input stream is prepared. Preparing a new input stream may refer to, for example, accessing the new data source and filling some input buffers so that data will be immediately available to the next "read" request. The input streams (e.g., custom input streams developed for use with the synchronization application) may include a "clone" method, which returns a new input stream and accesses the same data source, but is positioned at a different offset and is buffered independently. This could be the basis for the "new offset" operation. A pause and resume operation can be caused by a switch to a data source consisting of silence, and then back to the original input stream.

Regardless of the nature of the replacement input stream, the stream may be slipped into place by the state management system by, for example, calling a method "enqueueSwitchover" on the scheduledAudioPlayer. This method may receive the same arguments as the "play" method: for example, inputStream, offset, and start time, and may set them in global instance variables in the scheduledAudioPlayer. When the running code in the "write subsequent buffers" process executed at block 108 (see FIG. 1) sees these variables set, it begins the process of awaiting switchover time at block 403 (see FIG. 4). This uses the same calculation of the number of milliseconds of data that is written to occupy the player until the new data is due to play, as was used in block 105 (see FIG. 1) to determine how much silence to write prior to the data from the first input stream. Referring to block 403, data from the current input stream, not silence, is used to fill this interval. When the number of milliseconds of data needed to fill the interval until the new timestamp is less than a single buffer duration, the switchover buffer is written at block 405. The switchover buffer is filled with the calculated amount of data from the old input stream, filled the rest of the way with data from the new input stream, and is written. At this point, the new inputstream and the new padding value (e.g., the amount of data from the old stream in the switchover buffer) will replace the old, and the global variables that held them during the transition are nulled. At this point, subsequent buffers from the new input stream are written at block 405. This may be implemented with corrective feedback in a similar manner as that described with reference to block 108 of FIG. 1.

NTP Network

According to an exemplary embodiment, to be able to run in non-privileged mode on the mobile devices, NTP clients may run on a non-standard port such as, for example, 1123, as opposed to the standard port 123. When this implementation is utilized, the NTP clients will not have direct access to the world wide network of time severs, which use the standard port. As a result, a custom network of time servers may be created, maintained, and utilized. For example, application web servers may be used, and additional time servers may also be added. In the case, where devices have a local network available and are playing content from that local network, they may provide time server services to each other, arriving at their own private time standard. In an exemplary embodiment, the standard port 123 may be utilized.

iOS® Design for Audio Application

Figure 10:
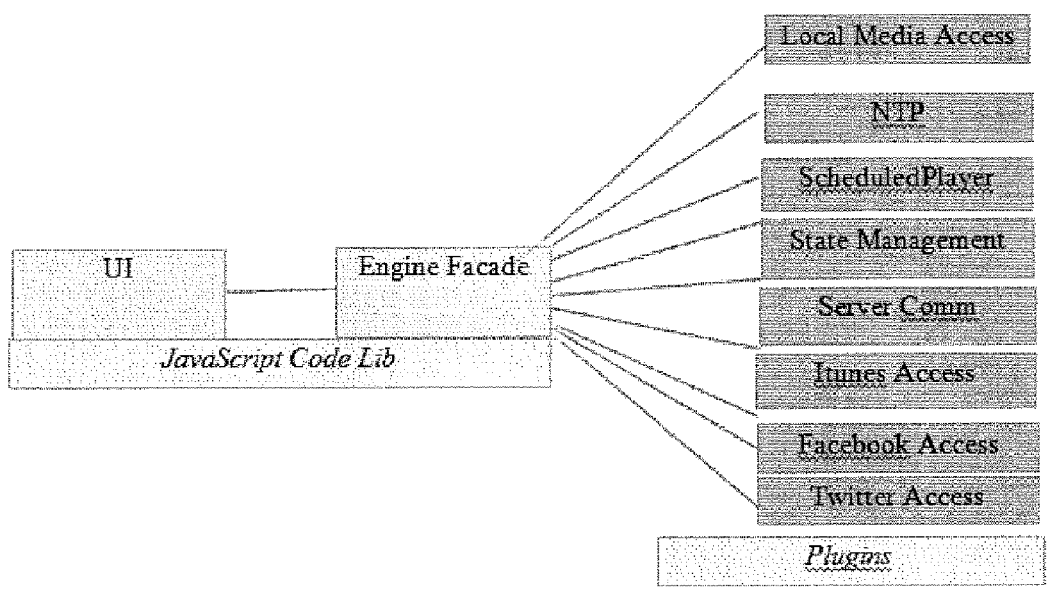

FIG. 10 shows an overview of an iOS® implementation of the synchronization application, according to an exemplary embodiment of the present disclosure.

The user interface in an iOS® implementation may be built to provide a browser-like programming environment. The user interface displays data and reacts to user input. More complex operations may be carried out using plugins, which are iOS® Objective-C program's. For example, the UI accesses functions in the plugins via the 'Engine Facade', which consists of a stub for each plugin method to be invoked. In an exemplary embodiment, some plugins may be written in Haxe and compiled into C and, thereafter, compiled into binary, allowing for some code to be shared across different platforms (e.g., iOS® and Android®).

A plugin method may be invoked from the javascript code asynchronously via, for example, the PhoneGap.exec( ) function, which accepts 5 arguments: onSuccess, onError, 'plugin name', 'method name', [argument list]. Functions to call back in the event of success or an error include, for example, the name of the plugin and target method, and the arguments to pass.

Facade

The facade provides a series of wrapper functions allowing, for example, the following to be written: ScheduledMediaPlayer.start(fileid, offset, timestamp) instead of PhoneGap.exec(onSuccess, onError, 'ScheduledMediaPlayer', 'start', [fileid, offest, timestamp]). This approach allows for some amount of simplification to be made to the remainder of the UI code.

Server Comm

The "Server Comm" component contains methods to retrieve available bookmarks and the user's monitored list of bookmarks from the server, to select any retrieved bookmark for monitoring, and to select any monitored bookmark for playback. These operations are available to a follower.

A leader selects audio for playback from files in the local file system, or from streams available from a $3^{rd}$ party streaming service. The function of searching for and retrieving such files and streams is provided by the "Server Comm" component, even though these files may not be hosted on the application server. When a leader makes such a selection, the corresponding bookmark is uploaded to the application server.

State Management

The State Management system monitors changes in the selected bookmark, and runs commands on the scheduledAudioPlayser to affect the corresponding changes in audio playback.

NTP

NTP runs in the background, and maintains an independent time standard as an offset from the device uptime clock to the correct local time.

Engine Facade

The "Engine Facade" consists of one javascript object for each plugin. This object contains one method for each method implemented by the plugin. In general "operation (arg1, arg2 . . . )" may invoke phonegap.exec(success, error, 'plugin name', 'opertation', [arg1, arg2, . . . ]). However, exemplary embodiments are not limited to utilizing Phonegap.

User Identities, Authentication, and Social Networking

According to exemplary embodiments, each user may have an identity, an account number, a created timestamp, a user name, and additional information. For example, the identify may refer to each device and may store identity information in a local file. The account number is a unique number issued by the server when the account is created. The created timestamp is a timestamp indicating when the account number was issued. The user name is a user selected pseudonym identifying the user to other users. The additional information may include, for example, a collection of key/value pairs providing profile information.

Each Identity may have several aliases which can be used to login. For example, aliases corresponding to different social networks may be used to login. Each alias may have a corresponding account number, alias name, and authentication information. For example, the account number is the account number the alias represents, the alias name is the name used for the alias, and the authentication information may include the name of the social site to be used for authentication, and/or a hash of a password.

According to an exemplary embodiment, an account number may be issued by the server every time the server receives a connect message which does not include an account number. If an alias is created for such an account number within a predetermined amount of time (e.g., about 5 minutes), a new user profile is created. A password based alias can be specified by providing a unique identifier such as, for example, an email address and a password. A social site based alias can be provided by authenticating through that social site's standard authentication protocol (e.g., OAuth, OAuth2, etc.).

Logging in using social site login information may include the user attempting to login, and an http GET being issued to the server's "oauth servlet" requesting "login" and specifying a provider code identifying the social site to be used. The "oauth servlet" may then look up the provider code and retrieve the "oauth helper" object configured to handle the particular social site. This helper class may provide a redirect url that will send the user to the social site to authenticate. If the user is not currently logged in, the social site will present a dialog asking the user to log in. After the user logs in, or immediately, if the user was already logged in, the user is redirected back to the oauth servlet along with the appropriate credentials (e.g., an "access token"). The oauth helper validates these tokens, and logs the user in using the user name provided by the social site. This user name becomes the alias name for this alias. Bookmarks may be identified by the account number of the holder. However, when searching for a bookmark by 'name', any of the following may be used to locate it: the account number, the user name in the profile, any user name associated with an alias, etc. Users can also search based on any key/value pair in the profile.

In an exemplary embodiment, data is added to or removed from a data queue in a controlled fashion to synchronize access to the data by multiple devices. The synchronization process may be described as having three phases: a start-up phase (e.g., a handoff phase), a transition phase, and a playback phase. Dynamic correction may occur during the playback phase.

In an exemplary embodiment, since a data queue has a known rate at which it outputs data, data input may be controlled such that data is input to the queue at a certain position and at a certain time to cause data to be output by the data queue at a specified time.

In an exemplary embodiment, two or more processes are synchronized using a clock, and communication between the two or more processes may be distributed. Communication may include, for example, a date/time and a position.

In an exemplary embodiment, media may be promoted, and the promotability of media may be tested, by allowing individuals to experience the media at the same time as one another. For example, certain individuals having a high profile (e.g., celebrities) often have a large following in the social media world, and other users may wish to be "in sync" with these individuals. Synchronizing a large number of users with an individual having a high profile allows for the promotion of certain media, and the testing of the promotability of certain media.

In an exemplary embodiment, the marketability of media may be measured among a specific demographic by allowing a user to function as a leader, and allowing others to follow along (for example, in a manner similar to radio listeners following along with a disc jockey). In this embodiment, devices can track the behavior of individuals listening along, individuals switching away from the followed stream, raising or lowering volume, dancing (e.g., using motion detection capabilities of the user's device), etc. A statistical analysis may then be implemented to correlate reactions, which can in turn be used to optimize market spending.

In an exemplary embodiment, the output of a buffer or data queue may be controlled based on an analysis of the requesting behavior at the input of the buffer or data queue.

In an exemplary embodiment, the sale of media may be optimized by encouraging consumers to experience the same media at the same time, and subsequently encouraging the consumers to buy a recording or right to play the music based on the users' shared experience.

In an exemplary embodiment, precision scheduling may be performed in a variable latency environment by utilizing an asymptotic data rate condition. The precision scheduling may be performed despite variable latency utilizing, for example, a long term average rate, or by inserting content into a running data stream having a known long term average rate.

In an exemplary embodiment, a hand-off (e.g., precise scheduling) may be performed despite variable latency by "handing off" input into an output stream with a known average data rate. For example, input may be provided to a data buffer or queue having an unpredictable latency to produce a change in output at a known, precise moment in time. For example, in an exemplary embodiment, an audio player may utilize this method to schedule a change from one audio source to another with high accuracy (e.g., millisecond accuracy). Two such audio players, having synchronized clocks, may cue the same program at the same instant, and thereafter play the program in synchrony. Small adjustments may be implemented to correct drift. This method may further be utilized to schedule the start of playback as is used to switch from one program to another when the initial input stream is silent (e.g., all zeros).

In an exemplary embodiment, wireless transmissions (e.g., WiFi, Bluetooth, cellular, etc.) and multi-cast or broadcast technologies may be utilized to make media available to a large number of listeners in one or more geographic area, allowing a large number of people to receive media rapidly.

In an exemplary embodiment, synchronized playback may be implemented in large gatherings (e.g., concerts, protest, etc.), allowing for the synchronized playback of different media in different groups on many devices at the same time. Exemplary embodiments may allow for the ability to have many plans queued, and have the actual activities selected, at random or deliberately, close to the start time of the gathering or during a specific activity of the gathering. Thus, exemplary embodiments allow for coordinated actions during gatherings that are either planned or unplanned.

In an exemplary embodiment, active and athletic activities may be encouraged by interacting with social media and matching people having related interests (e.g., musical taste and activity interests such as, for example, dancing, karaoke, skating, biking, spinning, etc.). A music identification system such as, for example, EchoPrint, allows for the identification of music that more than one person has on his or her device, allowing for the synchronized listening of media that all users already have on their devices. Other music that these groups of people may enjoy may also be identified and suggested to the users.

In an exemplary embodiment, a "hand off" procedure may be utilized to provide accurate synchronization despite high variable latency of a media player subsystem. The "hand off" procedure may further be used to start from a situation in which no media is playing (e.g., silence) to play media, or to start from playing previous media to playing subsequent media.

In an exemplary embodiment, NTP running in a non-privileged mode on devices including, for example, smart phones, tablet computers, etc. may be utilized for synchronized playback. NTP typically modifies the main system clock and uses low numbered ports. According to exemplary embodiments, NTP that is implemented may utilize high numbered ports. For example, in exemplary embodiments, NTP may run on high number ports and the system clock may not be modified. Rather, an application clock, which is modeled as an offset on one of the system clocks, may be utilized for synchronization.

In an exemplary embodiment, an accurate time of playback may be maintained as an offset from the system time of a device.

In an exemplary embodiment, synchronization of media playback may be integrated with social networks having capabilities such as, for example, adding friends, removing friends, etc. For example, in exemplary embodiments, a user may see what his or her friends are currently listening to, and have the ability to join in at that specific moment.

In an exemplary embodiment, synchronization methods utilize bookmarks, which include indications relating to past or present playback positions, or predications relating to future playback positions (e.g., playback occurred at time T, x units into media file F; playback will occur at time T, x units into media file F).

In an exemplary embodiment, the chaining of listeners may be implemented. For example, device A and device B may select a media file, device C may follow device A, device E may follow device C, and when device C switches to following device B, device E will be synchronized with devices B and C.

Aspects of the present disclosure may be embodied as a system, method, computer program product, or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any non-transitory tangible medium that can contain, or store a program for use by or in connection with an instruction execution system, apparatus, or device.

Figure 11:
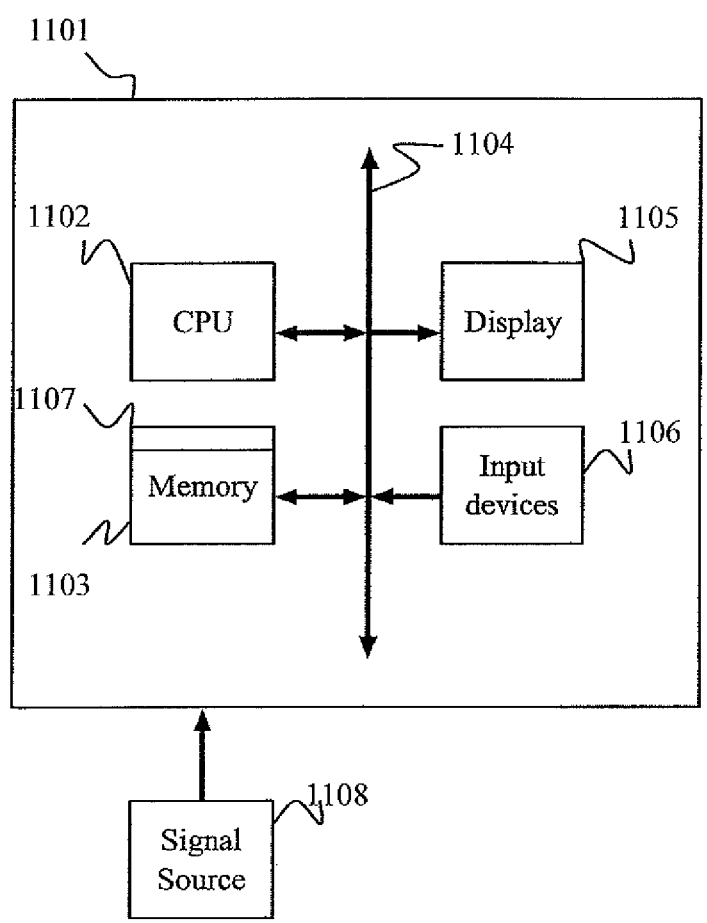
FIG. 11 shows an exemplary computer system for executing a method according to an embodiment of the present disclosure.

For example, referring to FIG. 11, according to an exemplary embodiment of the present invention, a computer system 1101 for use with exemplary embodiments of the present disclosure may include, inter alia, a central processing unit (CPU) 1102, a memory 1103 and an input/output (I/O) interface 1104. The computer system 1101 is generally coupled through the I/O interface 1104 to a display 1105 and various input devices 1106 such as a mouse and keyboard. The support circuits can include circuits such as cache, power supplies, clock circuits, and a communications bus. The memory 1103 can include random access memory (RAM), read only memory (ROM), disk drive, tape drive, or a combination thereof. Exemplary embodiments of the present disclosure can be implemented as a routine 1107 that is stored in memory 1103 and executed by the CPU 1102 to process the signal from the signal source 1108. As such, the computer system 1101 is a general-purpose computer system that becomes a specific-purpose computer system when executing the routine 1107 of the present invention.

The computer platform 1101 also includes an operating system and micro instruction code. The various processes and functions described herein may either be part of the micro instruction code, or part of the application program (or a combination thereof), which is executed via the operating system. In addition, various other peripheral devices may be connected to the computer platform such as an additional data storage device and a printing device.

It is to be further understood that, because some of the constituent system components and methods depicted in the accompanying figures may be implemented in software, the actual connections between the system components (or the processes) may differ depending upon the manner in which the present invention is programmed. Given the teachings of the present disclosure provided herein, one of ordinary skill in the related art will be able to contemplate these and similar implementations or configurations of exemplary embodiments of the present disclosure.

While the present disclosure has been particularly shown and described with reference to the exemplary embodiments thereof, it will be understood by those of ordinary skill in the art that various changes in form and detail may be made therein without departing from the spirit and scope of the present disclosure as defined by the following claims.

What is claimed is:

1. A method of managing data in a data queue, comprising:
    analyzing media currently being played, or to be played by a first computing device functioning as a leader, wherein an offset into the media and a timestamp corresponding to the offset are identified;
    calculating a buffer duration corresponding to an amount of time that the data queue takes to output data currently in the data queue; and
    playing the media at the leader and a second computing device functioning as a follower, in a substantially synchronized manner, by inputting data to the data queue at a specified time based on the calculated buffer duration, the offset, and the timestamp.

2. The method of claim 1, wherein the media comprises audio data.

3. The method of claim 2, further comprising:
outputting data, from the leader, indicating a past position, a present position, or a future position relating to the audio data.

4. The method of claim 3, wherein the data output by the leader comprises a timestamp.

5. The method of claim 1, further comprising pre-loading data in the data queue.

6. The method of claim 1, wherein the data input to the data queue at a specified time comprises dummy data.

7. The method of claim 1, wherein the data input to the data queue at a specified time comprises subsequent data to be output to the leader and the follower.

8. The method of claim 1, further comprising:
synchronizing data output from the data queue to the leader and the follower using a network time protocol (NTP).

9. The method of claim 1, wherein the first and second computing devices are smart phones or tablet computers.

10. A non-transitory computer readable storage medium embodying instructions executed by a processor to perform a method of managing data in a data queue, comprising:
analyzing media currently being played, or to be played by a first computing device functioning as a leader, wherein an offset into the media and a timestamp corresponding to the offset are identified;
calculating a buffer duration corresponding to an amount of time that the data queue takes to output data currently in the data queue; and
playing the media at the leader and a second computing device functioning as a follower, in a substantially synchronized manner, by inputting data to the data queue at a specified time based on the calculated buffer duration, the offset, and the timestamp.

11. The computer readable storage medium of claim 10, wherein the media comprises audio data.

12. The computer readable storage medium of claim 10, further comprising:
outputting data, from the leader, indicating a past position, a present position, or a future position relating to the media.

13. The computer readable storage medium of claim 12, wherein the data output by the leader comprises a timestamp.

14. The computer readable storage medium of claim 10, further comprising pre-loading data in the data queue.

15. The computer readable storage medium of claim 10, wherein the data input to the data queue at a specified time comprises dummy data.

16. The computer readable storage medium of claim 10, wherein the data input to the data queue at a specified time comprises subsequent media to be output to the leader and the follower.

17. The computer readable storage medium of claim 10, further comprising:
synchronizing data output from the data queue to the leader and the follower using a network time protocol (NTP).

18. The computer readable storage medium of claim 10, wherein the first and second computing devices are smart phones or tablet computers.

19. A method of synchronizing media playing among a set of media players, comprising the steps of:
communicating an identification of a media source, an offset into the media source, and a start time at which playback from the offset into the media source begins;
receiving, by the set of media players, the identification of the media source, the offset, and the start time;
writing dummy data to internal buffers of the set of media players to consume a time remaining until the start time;
inserting media data read from the media source at the offset into a last buffer before the start time, to ensure the media data is played on time;
playing the media data; and
maintaining synchronization between each of the set of media players by inserting media data to the internal buffer of a media player of the set of media players when playback of that media player runs ahead of schedule, and skipping data in the internal buffer of a media player of the set of media players when playback of that media player falls behind schedule.

20. The method of claim 19, further comprising, if another media player joins after media playing has begun, adjusting the offset and start time on the another media player and a device latency factor for the another media player.

21. The method of claim 19, wherein once an internal buffer of a particular media player of the set of media players is filled, a time required for data in a newly written buffer to be played is a fixed value for the particular media player of the set of media players, and the particular media player of the set of media players will accept new data only when a previous buffer finishes playing.

22. The method of claim 19, further comprising using IP multicast to distribute the media being played to the set of media players.

* * * * *